(12) United States Patent
Amezawa et al.

(10) Patent No.: US 10,391,553 B2
(45) Date of Patent: Aug. 27, 2019

(54) MOLDING MACHINE

(71) Applicant: Toshiba Kikai Kabushiki Kaisha, Chiyoda-ku, Tokyo (JP)

(72) Inventors: Hiroki Amezawa, Zama (JP); Satoru Aida, Zama (JP); Toshiaki Toyoshima, Zama (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 37 days.

(21) Appl. No.: 15/801,954

(22) Filed: Nov. 2, 2017

(65) Prior Publication Data

US 2018/0133786 A1    May 17, 2018

(30) Foreign Application Priority Data

Nov. 15, 2016  (JP) .................................. 2016-222061

(51) Int. Cl.
*B22D 17/32*  (2006.01)
*B22D 17/22*  (2006.01)
(Continued)

(52) U.S. Cl.
CPC ......... *B22D 17/32* (2013.01); *B22D 17/2236* (2013.01); *B29C 45/1774* (2013.01);
(Continued)

(58) Field of Classification Search
CPC .... B22D 17/22; B22D 17/2236; B22D 17/32; B29C 45/17; B29C 45/1774; B29C 45/40;
(Continued)

(56) References Cited

U.S. PATENT DOCUMENTS 4,874,032 A * 10/1989 Hatamura .............. B22D 17/32
                                                    164/457
5,363,899 A * 11/1994 Takagi et al. .......... B22D 17/32
                                                    164/113
2005/0217821 A1* 10/2005 Fukumoto et al. .... B22D 17/10
                                                    164/457

FOREIGN PATENT DOCUMENTS

JP    H05-123847    5/1993
JP    2008-142758   6/2008

OTHER PUBLICATIONS

English Language Abstract of JP 2008-142758 published Jun. 26, 2008.

(Continued)

*Primary Examiner* — Kevin P Kerns
(74) *Attorney, Agent, or Firm* — DLA Piper LLP US

(57) ABSTRACT

A die casting machine includes a plurality of ejector pins capable of advancing and retracting together with respect to the internal portion of a die; an electric motor capable of driving the plurality of ejector pins; a position sensor capable of detecting the positions of the plurality of ejector pins; a force sensor capable of detecting the pressure which is given to the molding material inside the die by the plurality of ejector pins; a display device capable of displaying images, and a control device controlling the electric motor and display device. The control device includes a drive control part which controls the electric motor so as to generate a driving force making the plurality of ejector pins advance to the inside of the die after the start of injection and before die opening, and a display control part which controls the display device so as to display the position detected by a position sensor and the pressure detected by a force sensor along a common time axis.

7 Claims, 8 Drawing Sheets

(51) Int. Cl.
*B29C 45/17* (2006.01)
*B29C 45/40* (2006.01)
*B29C 45/76* (2006.01)
*B29C 45/77* (2006.01)
*B29C 45/80* (2006.01)

(52) U.S. Cl.
CPC ........ *B29C 45/401* (2013.01); *B29C 45/7626* (2013.01); *B29C 45/77* (2013.01); *B29C 45/80* (2013.01); *B29C 2045/7606* (2013.01); *B29C 2945/76006* (2013.01); *B29C 2945/76083* (2013.01); *B29C 2945/76244* (2013.01); *B29C 2945/76287* (2013.01); *B29C 2945/76381* (2013.01); *B29C 2945/76568* (2013.01); *B29C 2945/76725* (2013.01); *B29C 2945/76896* (2013.01)

(58) Field of Classification Search
CPC ... B29C 45/401; B29C 45/76; B29C 45/7626; B29C 45/77; B29C 45/80
USPC ... 164/155.3, 155.4, 154.2, 154.8, 303, 344, 164/347
See application file for complete search history.

(56) References Cited

OTHER PUBLICATIONS

English Language Abstract of JP H05-123847 published May 21, 1993.

* cited by examiner

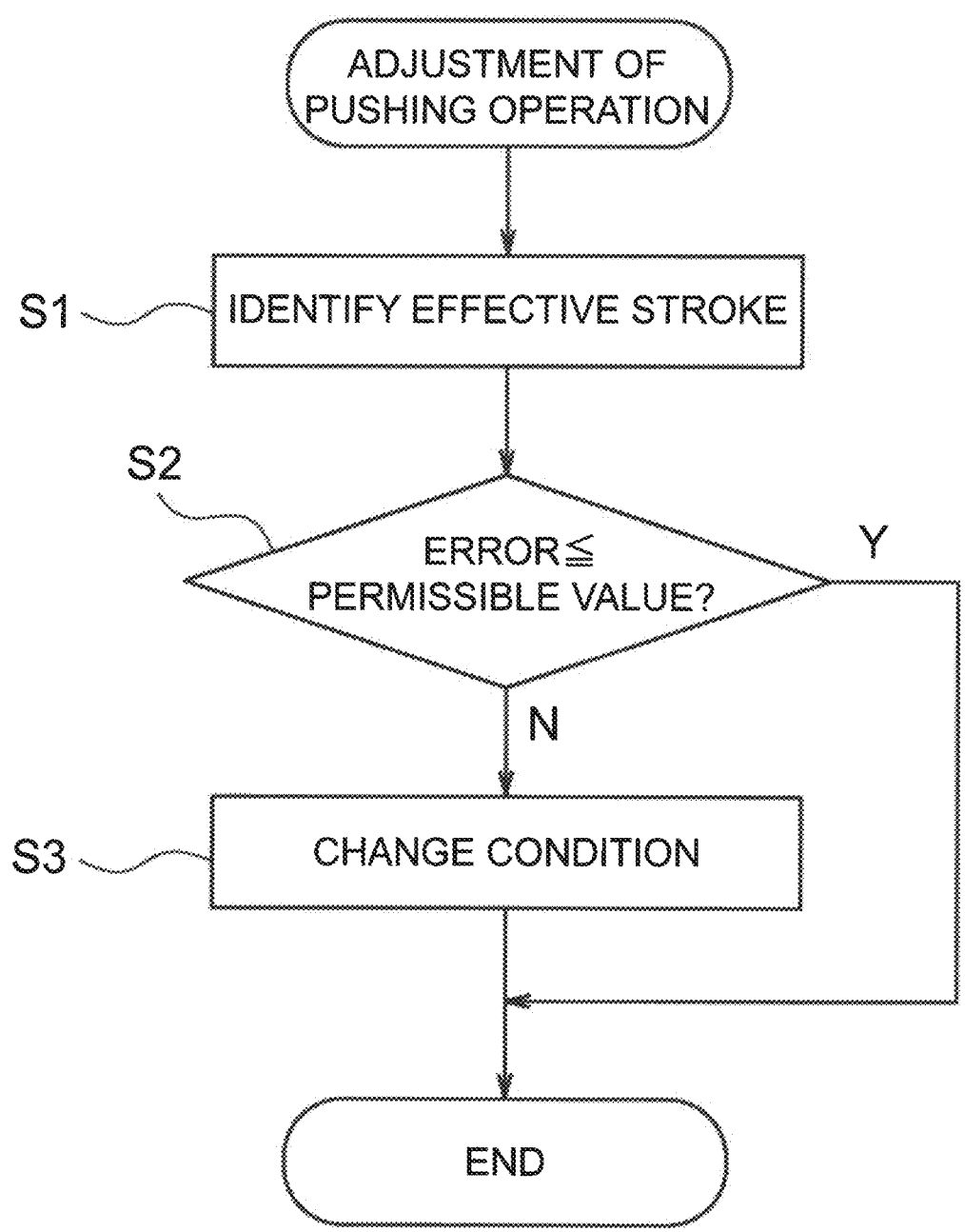

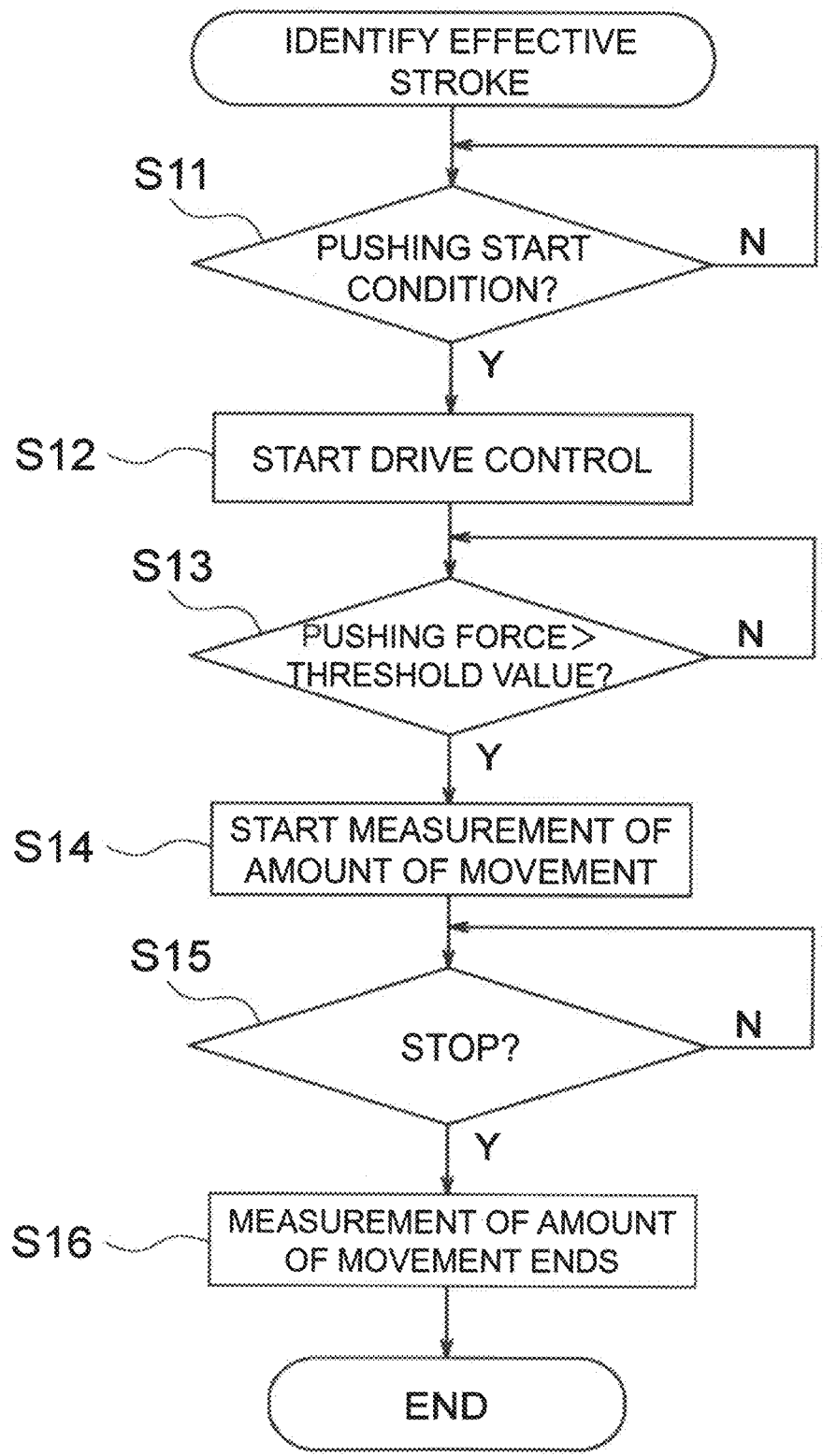

MOLDING MACHINE

CROSS-REFERENCE TO RELATED APPLICATION(S)

This application claims the benefit of priority from Japanese Patent Application No. 2016-222061, filed on Nov. 15, 2016. The entirety of the above-listed application is incorporated herein by reference.

TECHNICAL FIELD

The present disclosure relates to a molding machine which injects a molding material in a liquid state or semi-solid state into a mold to shape it. The molding machine is for example a die casting machine or a plastic injection molding machine.

BACKGROUND ART

Known in the art is a molding machine which injects a molding material into a mold, then uses pushing pins to push against the molding material in the mold (PLT 1). By using pushing pins to a local pushing operation against the material, for example, a shrinkage cavity or other cavity which is generated along with solidification and shrinkage of the molding material can be reduced. PLT 1 discloses to drive the pushing pins by a servo motor, to use pressure feedback control along a time axis to control the servo motor, to determine the pushing start timing with reference to various parameters, and so on.

PLT 2 proposes use of ejector pins in place of pushing pins. The ejector pins are for peeling off a shaped article from a mold after a molding material is solidified in the mold and the shaped article is formed. They are driven so as to protrude from the inner surface of the mold at the time of opening or after opening. By utilizing such ejector pins as pushing pins, for example, it becomes possible to perform a local pushing operation against a material even in a case where it is difficult to secure the pushing pins and their driving mechanism on the back surface of the mold.

CITATION LIST

Patent Literature

PLT 1: Japanese Patent Publication No. 2008-142758A
PLT 2: Japanese Patent Publication No. 5-123847A

SUMMARY OF INVENTION

Technical Problem

In the molding machine in PLT 1, in order to suitably perform a local pushing operation against the material, for example, an operator must set various parameters etc. for pressure control while repeatedly fabricating prototypes and inspecting the prototypes for quality so as to find the suitable parameters. As a result, for example, the load on the operator is liable to become larger and the function of a local pushing operation is liable to not be effectively utilized. Further, when using ejector pins as the pushing pins, unique problems are liable to arise in the above such practical use. Therefore, it is desired to provide a molding machine capable of making effective use of a local pushing operation using ejector pins.

Solution to Problem

A molding machine according to one aspect of the present disclosure includes a plurality of ejector pins capable of moving together with respect to a mold; an electric motor capable of driving the plurality of ejector pins; a position sensor capable of detecting positions of the plurality of ejector pins; a pressure sensor capable of detecting a pressure which is given by the plurality of ejector pins to a molding material; a display device capable of displaying an image; and a control device controlling the electric motor and the display device. The control device includes a drive control part which controls the electric motor so as to generate a driving force moving the plurality of ejector pins forward to the internal portion side of the die after the start of injection and before die opening, and a display control part which controls the display device so as to display the position detected by the position sensor and the pressure detected by the pressure sensor along a common time axis.

Preferably, the display control part controls the display device so as to display the speed of the plurality of ejector pins based on the detection value of the position sensor along the time axis.

Preferably, the display control part controls the display device so as to display by a numerical value an amount of movement of the plurality of ejector pins to the internal portion side of the mold based on the detection value of the position sensor, the amount of movement being after the pressure detected by the pressure sensor becomes a predetermined threshold value or more.

Preferably, the molding machine further includes an input device on which an input operation is carried out. The drive control part controls the electric motor so as to start the forward movement of the plurality of ejector pins at a timing designated by the input operation.

Preferably, the molding machine further includes an input device on which an input operation is carried out. The drive control part controls the electric motor so that the plurality of ejector pins move forward at a speed designated by the input operation.

Preferably, the molding machine further includes an input device on which an input operation is carried out. The drive control part controls the electric motor so that the plurality of ejector pins push against the molding material inside the mold by a pressure designated by the input operation.

Preferably, the drive control part changes at least one of the forward movement start timing of the plurality of ejector pins, the speed of the plurality of ejector pins, and the force given by the plurality of ejector pins to the molding material in accordance with the amount of movement of the plurality of ejector pins to the internal portion side of the mold based on the detection value of the position sensor, the amount of movement being after the pressure detected by the pressure sensor becomes a predetermined threshold value or more.

Advantageous Effects of Invention

According to the present disclosure, effective utilization of a local pushing operation using ejector pins is facilitated.

BRIEF DESCRIPTION OF DRAWINGS

FIG. 7 is a flow chart showing an example of a procedure of processing for adjusting the pushing operation.

FIG. 8 is a flow chart showing an example of a procedure of processing for identifying the effective stroke.

DESCRIPTION OF EMBODIMENTS (Overall Configuration of Die Casting Machine)

Figure 1:
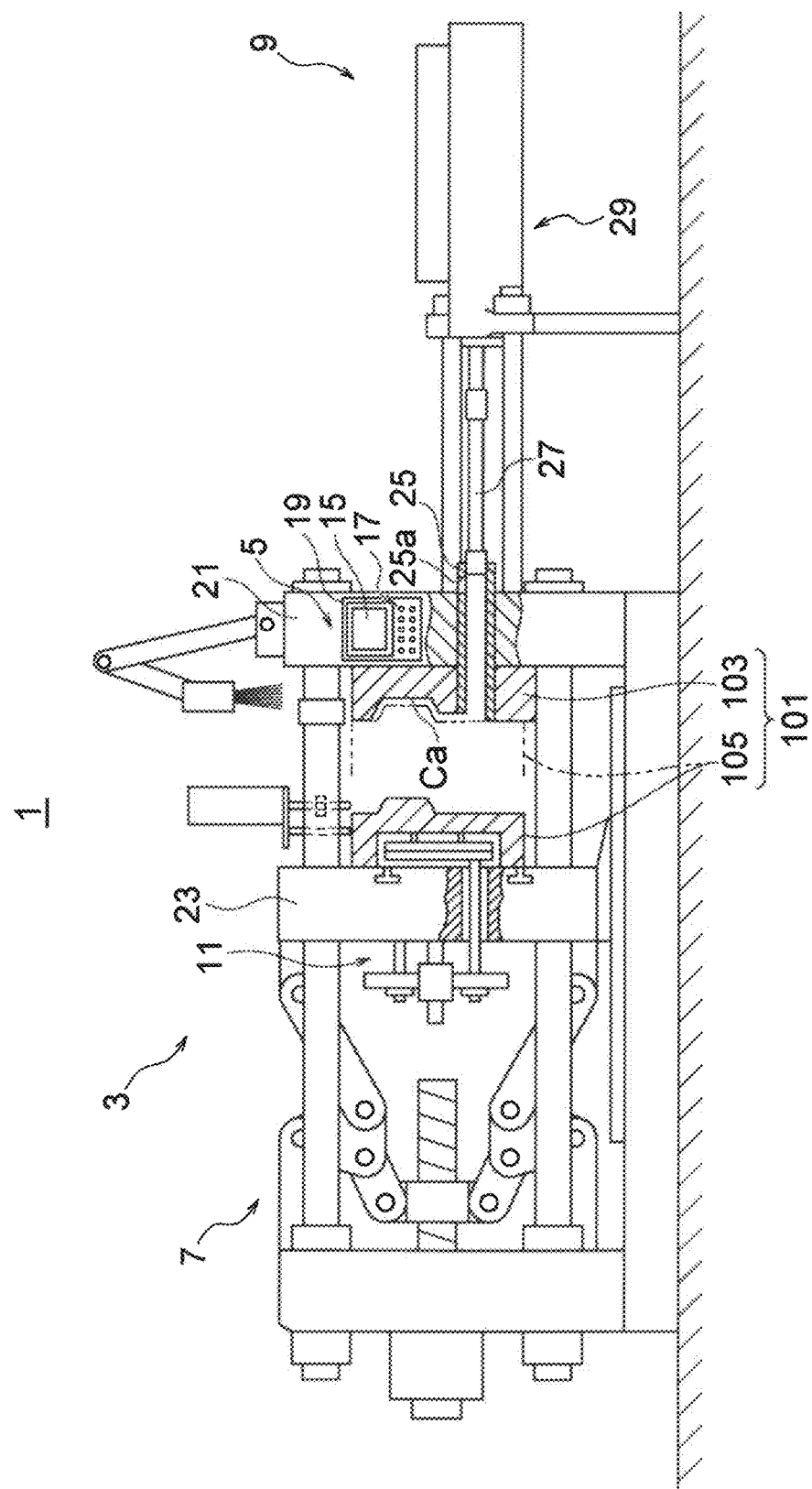
FIG. 1 is a schematic view showing the configuration of principal parts of a die casting machine according to an embodiment of the present disclosure.

FIG. 1 is a side view, partially including a cross-sectional view, showing the configuration of principal parts of a die casting machine 1 according to an embodiment of the present disclosure.

The die casting machine 1 injects a pre-solidified (liquid state or semi-solid state) metal material into a die 101 (cavity Ca and other space, same in following description) and solidifies the metal material in the die 101 to thereby manufacture a die casting (shaped article). The metal is for example aluminum or an aluminum alloy.

The die 101 for example includes a fixed die 103 and moving die 105. In the explanation of the present embodiment, for convenience, the cross-section of the fixed die 103 or moving die 105 is indicated by one type of hatching. These dies may be directly cut types or nested types. Further, a core or the like may be combined with the fixed die 103 and moving die 105.

The die casting machine 1 for example has a machine body 3 which performs a mechanical operation for molding and a control unit 5 which controls the operation of the machine body 3.

The machine body 3, for example, has a clamping device 7 which opens/closes and clamps the die 101, an injection apparatus 9 which injects the pre-solidified metal material into the die 101, and an ejection device 11 which ejects a die casting from the fixed die 103 or moving die 105 (moving die 105 in FIG. 1). In the machine body 3, the configurations other than the ejection device 11 (for example configurations of the clamping device 7 and injection apparatus 9) may be basically made the same as known configurations (for example, except the portions concerning attachment of the ejection device 11).

Note that, in the explanation of the injection apparatus 9, the left side on the drawing sheet (die 101 side) is sometimes defined as forward and the terms "forward movement" etc. are used. In the explanation of the ejection device 11, the right side on the drawing sheet (die 101 side) is sometimes defined as forward and the terms "forward movement" etc. are used.

In the molding cycle, the clamping device 7 moves the moving die 105 toward the fixed die 103 and closes the mold. Further, the clamping device 7 gives a clamping force in accordance with an amount of extension of tie bars (notation is omitted) to the die 101 for clamping. In the clamped die 101, a cavity Ca having the same shape as the shaped article is formed. The injection apparatus 9 injects and fills the pre-solidified metal material into that cavity Ca. The pre-solidified metal material which is filled in the cavity Ca is stripped of heat by the die 101 and cooled and solidified. Due to this, the shaped article is formed. After that, the clamping device 7 moves the moving die 105 in a direction separating this from the fixed die 103 and opens the die. At this time or after this, the ejection device 11 ejects the shaped article from the moving die 105.

The control unit 5 for example has a control device 13 (see FIG. 4) which performs various processing and outputs control commands, a display device 15 displaying an image, and an input device 17 which receives input operations by an operator. Further, from another viewpoint, the control unit 5 for example has a not shown control panel having a power supply circuit and control circuit etc. and an operation part 19 as a user interface.

The control device 13 is for example provided in a not shown control panel and operation part 19. The control device 13 may be configured suitably divided or dispersed. For example, the control device 13 may include lower control devices for the clamping device 7, injection apparatus 9, and ejection device 11 and a higher control device which performs control for synchronizing these lower control devices or other control.

The display device 15 and input device 17 are for example provided in the operation part 19. The operation part 19 is for example provided at a fixed portion of the clamping device 7. The display device 15 is for example configured by a touch panel including a liquid crystal display or organic EL display. The input device 17 is for example configured by mechanical switches and the above touch panel.

(Configuration of Die and its Periphery)

Figure 2:
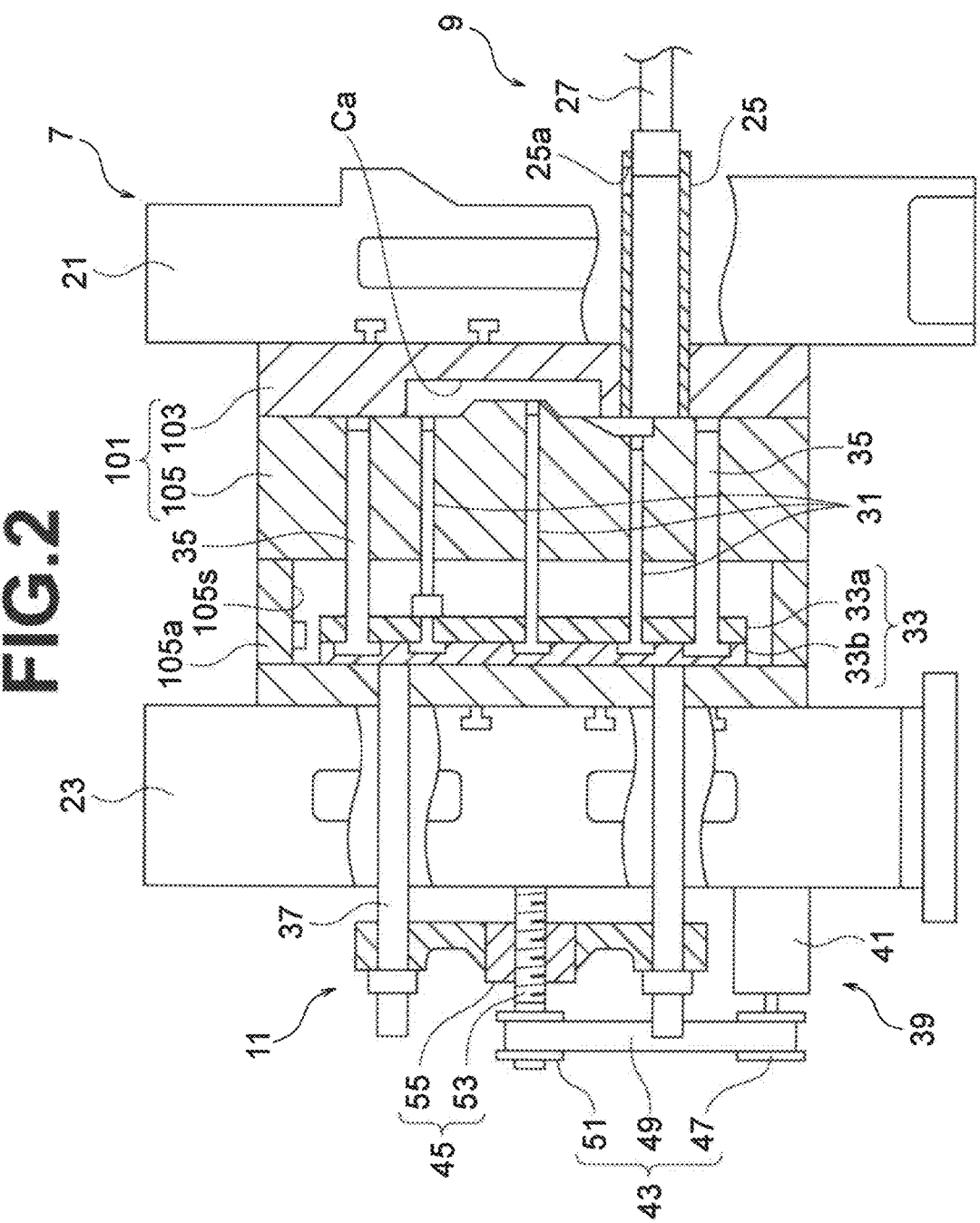
FIG. 2 is a schematic view showing the configuration of principal parts of a die and its periphery of the die casting machine in FIG. 1.

FIG. 2 is a schematic view showing the configuration of the principal parts of the die 101 and its periphery.

The clamping device 7 for example has a fixed platen 21 which holds the fixed die 103 and a moving platen 23 which holds the moving die 105. The moving platen 23 faces the fixed platen 21 and can move in a direction approaching or a direction separating from the fixed platen 21. By the movement of this moving platen 23, the die 101 is closed and opened.

The injection apparatus 9 for example has a sleeve 25 communicated with the inside of the die 101, a plunger 27 capable of sliding in the sleeve 25, and an injection driving part 29 (FIG. 1) for driving the plunger 27. In the upper surface of the sleeve 25, a supply port 25a is opened.

When the clamping device 7 finishes clamping the die 101, one shot's worth of the metal material is supplied from the supply port 25a into the sleeve 27 by a not shown supply device. Further, the plunger 27 slides in the sleeve 25 from the illustrated position to the cavity Ca side whereby the metal material in the sleeve 25 is pushed out (injected) into the die 101.

(Ejection Device)

The moving die 105 has a space 105s for accommodating a portion of the ejection device 11 inside it. Note that, a die base 105a configuring part of the space 105s is explained as a portion of the moving die 105 in the present disclosure. The surface on the moving platen 23 side in the space 105s may be configured by a portion of the moving die 105 as illustrated or may be configured by a portion of the moving platen 23 different from the illustration.

The ejection device 11 for example has a plurality of ejector pins 31 for pushing against the shaped article, an ejection plate 33 for holding the plurality of ejector pins 31, guide pins 35 for guiding the ejection plate 33 at the time of movement of the ejector pins 31, and ejection rods 37 and an ejection driving part 39 for giving a driving force to the ejector pins 31 through the ejection plate 33.

When the metal material injected into the cavity Ca is solidified and the die casting is formed, the die 101 is opened by the clamping device 7. At this time, due to the shape of the die 101 and the operation of ejecting the die casting by the plunger 27 and so on, the die casting remains in the moving die 105. Further, by making the tips (front ends) of the ejector pins 31 protrude from the inner surface of the moving die 105, the die casting is separated from the inner surface of the moving die 105.

The ejector pins 31 are for example substantially shaft-shaped members having flanges at the rear ends. The ejector pins 31 are inserted into the moving die 105 (more strictly speaking, into a portion at the further front side from the die base 105a) in the opening/closing direction and can move in the insertion direction with respect to the moving die 105. The plurality of ejector pins 31 may be provided at suitable positions and in a suitable number in accordance with the shape of the interior of the die 101 (shape of the space including not only the cavity Ca, but also runner etc.) or the like.

The ejection plate 33 for example has a front side plate 33a and a rear side plate 33b which is superimposed behind and fixed to the front side plate 33a. The ejector pins 31 are for example inserted into the front side plate 33a and are fixed to the front side plate 33a by the flanges provided on the rear ends being sandwiched between the front side plate 33a and the rear side plate 33b. Note that, the ejection plate 33 may be configured so as to further have a not shown plate superimposed on the rear side plate 33b and fixed to the ejection rods 37 on the side of the rear side plate 33b opposite to the front side plate 33a as well. The ejection plate 33 is held in the space 105s of the moving die 105. The plurality of ejector pins 31 are fixed in common to the ejection plate 33, therefore move relative to the moving die 105 together along with the movement of the ejection plate 33.

The guide pins 35 for example have substantially the same configurations as those of the ejector pins 31 except their positions of arrangement and concrete dimensions. That is, the guide pins 35 are generally shaped as shafts with flanges on their rear ends. The guide pins 35 are inserted in the moving die 105 (in the portion on further front side than the die base 105a) in the opening/closing direction and can move relative to the moving die 105 in the insertion direction thereof. Further, the guide pins 35 are for example fixed at the ejection plate 33 at the flanges on the rear ends in the same way as the ejector pins 31. The plurality of guide pins 35, unlike the ejector pins 31, are for example positioned outside of the internal space of the die 101. In more detail, for example, the plurality of guide pins 35 are positioned at the four corners of the moving die 105. Further, the guide pins 35 are for example given diameters made larger than those of the ejector pins 31. The guide pins 35 (and ejector pins 31) fixed to the ejection plate 33 are inserted so that they can slide in the opening/closing direction with respect to the moving die 105, therefore the ejection plate 33 is only allowed to move in the opening/closing direction.

The ejection rods 37 are inserted in the moving platen 23 in the opening/closing direction and can move in the opening/closing direction relative to the moving platen 23. The tips of the ejection rods 37 (end parts on the right side on the drawing sheet) are fixed to the ejection plate 33. Accordingly, by giving a driving force in the axial direction with respect to the ejection rods 37, the ejection plate 33 can be moved in the front-back direction. The plurality of ejection rods 37 may be provided at suitable positions and in a suitable number in accordance with the shape and size etc. of the ejection plate 33.

The ejection driving part 39 is for example electric and has a rotary electric motor 41, a transmission mechanism 43 which transmits the rotation of the electric motor 41, and a conversion mechanism 45 which converts the rotation transmitted from the transmission mechanism 43 to linear motion.

The electric motor 41, although not shown, has a stator configuring one of a field magnet and armature and a rotor which configures the other of the field magnet or armature and rotates relative to the stator. The electric motor 41 may be given a suitable form. It may be for example a DC electric motor, may be an AC electric motor, may be a synchronous motor, or may be an induction motor. In the electric motor 41, for example, the motor body including the stator is provided in a fixed manner with respect to the moving platen 23. The position of arrangement and orientation of the electric motor 41 may be suitably set.

The transmission mechanism 43 is for example configured by a pulley-belt mechanism and has a pulley 47 fixed to the output shaft of the electric motor 41, a belt 49 hooked upon the pulley 47, and a pulley 51 upon which the belt 49 is hooked. The rotation of the electric motor 41 is for example transmitted by the transmission mechanism 43 to a position which is separated from the shaft center of the electric motor 41. At this time, the transmission mechanism 43 may change the speed of the rotation of the electric motor 41 or need not.

The conversion mechanism 45 is for example configured by a screw mechanism. The screw mechanism may be a ball-screw mechanism or sliding screw mechanism. The conversion mechanism 45 for example has a screw shaft 53 supported so that it can rotate around the axis and cannot move in the axial direction with respect to the moving platen 23 and has a nut 55 which is screwed with the screw shaft 53 and is restricted in rotation around the axis. The pulley 51 is fixed to the screw shaft 53. Accordingly, when the rotation of the electric motor 41 is transmitted through the transmission mechanism 43 to the screw shaft 53, the nut 55 moves in the axial direction.

The nut 55 and the ejection rods 37 are fixed to each other by suitable members. The axial direction of the conversion mechanism 45 coincides with the axial directions of the ejection rods 37 and the opening/closing direction. Accordingly, by the movement of the nut 55 in the axial direction, the ejection rods 37 are driven in their axial directions (opening/closing direction) and consequently the ejection plate 33 fixed to the ejection rods 37 is driven in the opening/closing direction.

Figure 3:
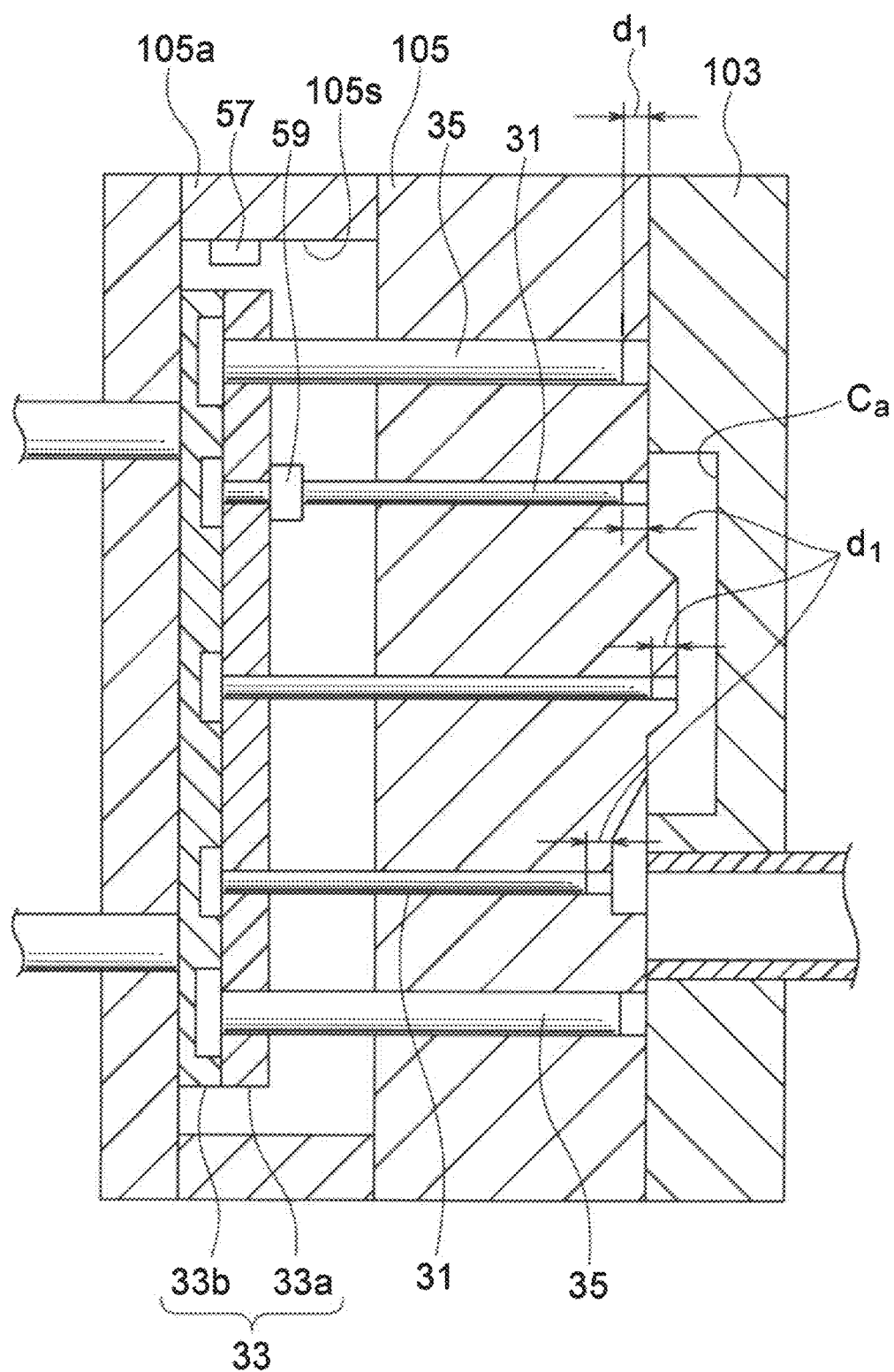
FIG. 3 is a partially enlarged view of FIG. 2.

FIG. 3 is a partially enlarged view of FIG. 2.

The retraction limits of the ejector pins 31, guide pins 35, and ejection plate 33 are for example defined by the ejection plate 33 abutting against the surface on the moving platen 23 side in the space 105s (suitable stopper members may be provided as well).

When the ejection plate 33 is positioned at the retraction limit, the front end faces of the ejector pins 31 have retracted by a distance dl from the inner surface of the moving die 105 (the surface forming the internal space), while the front end faces of the guide pins 35 have retracted by the distance dl from the parting line in the die 101 (where the surfaces of the fixed die 103 and the moving die 105 abut against each other). The distance dl is basically a length common to the plurality of ejector pins 31 and plurality of guide pins 35.

Here, in the usual ejection device, unlike FIG. 3, at the time when the ejection plate 33 is positioned at the retraction limit, the front end faces of the ejector pins 31 coincide with the inner surface of the moving die 105, and the front end faces of the guide pins 35 coincide with the matching surfaces in the die 101. Further, during closing (during clamping), the tips of the guide pins 35 abut against the leading edge of the fixed die 103, therefore the forward movement of the ejection plate 33 is restricted and consequently the ejector pins 31 cannot move into the die 101.

On the other hand, in the ejection device 11 in the present embodiment, even during the clamping, the ejection plate 33, ejector pins 31, and guide pins 35 can be moved forward by the distance dl. Due to this, by the ejector pins 31, a local pushing operation can be carried out with respect to the metal material injected into the die 101. Further, by the forward movement of the ejector pins 31 until the front end faces of the ejector pins 31 coincide with the inner surface of the moving die 105, concern over formation of unintended convex portions or concave portions in the shaped article is reduced.

The ejection device 11 has a position sensor 57 capable of detecting the positions of the ejector pins 31 and a force sensor 59 capable of detecting the force given to the metal material by the ejector pins 31. Note that, the force, pressure, and torque basically have linear relationships relative to each other. Therefore, in the present disclosure, sometimes they will not be discriminated. For example, the force sensor 59 may be grasped as one type of pressure sensor as well.

The position sensor 57 for example configures a magnetic or optical linear encoder together with a not shown scale part. Either of the position sensor 57 or scale part is provided in a fixed manner relative to the moving die 105, while the other is provided in a fixed manner relative to the ejector pins 31. Further, the position sensor 57 and/or control device 13 counts the number of pulses which are generated in accordance with the relative amounts of movement of the scale part and the position sensor 57 and can identify the positions of the ejector pins 31. Further, it counts the pulses per unit time and can identify the speed of the ejector pins 31.

Note that, in the illustrated example, the position sensor 57 is provided on the die base 105a and faces the not shown scale part which is provided on the ejection plate 33. Note, either of the position sensor 57 or the scale part only has to be fixed relative to the moving die 105. Therefore, for example, it may be provided on the moving platen 23 as well. In the same way, the other of the position sensor 57 and the scale part only has to be fixed relative to the ejector pins 31. Therefore, for example, it may be provided in the ejection rods 37, guide pins 35, ejector pins 31, or a member on the side nearer the electric motor 41 than the ejection rods 37.

The force sensor 59 is for example configured by a load cell which is provided in any (or all) of the ejector pins 31. The load cell is for example a strain gauge type. The force sensor 59 may be provided in series relative to an ejector pin 31 and receive the same force as the force received by the ejector pin 31 or may be provided on the periphery of an ejector pin 31 and calculate the force which is received by the ejector pin 31 from the strain of the ejector pin 31. The control device 13 can identify the pressure given from the ejector pins 31 to the metal material based on the detection signal from the force sensor 59 and the sectional areas of the ejector pins 31 which are input in advance. Note that, in the case where the force sensors 59 are provided for a plurality of ejector pins 31, for example, use may be made of a mean value of the detection values of the plurality of force sensors 59.

Note that, in the illustrated example, the force sensor 59 is directly provided on an ejector pin 31. However, the force sensor 59 may be provided on the ejection plate 33 as well. In this case, at the time of calculation of pressure, information of the number of ejector pins 31 is utilized. Further, the force sensor 59 may be provided on an ejection rod 37 as well. In this case, at the time of calculation of pressure, information of the number of ejector pins 31 and number of ejection rods 37 is utilized. The force sensor 59 may further be provided on the electric motor 41 side as well.

(Configuration of Signal Processing System)

Figure 4:
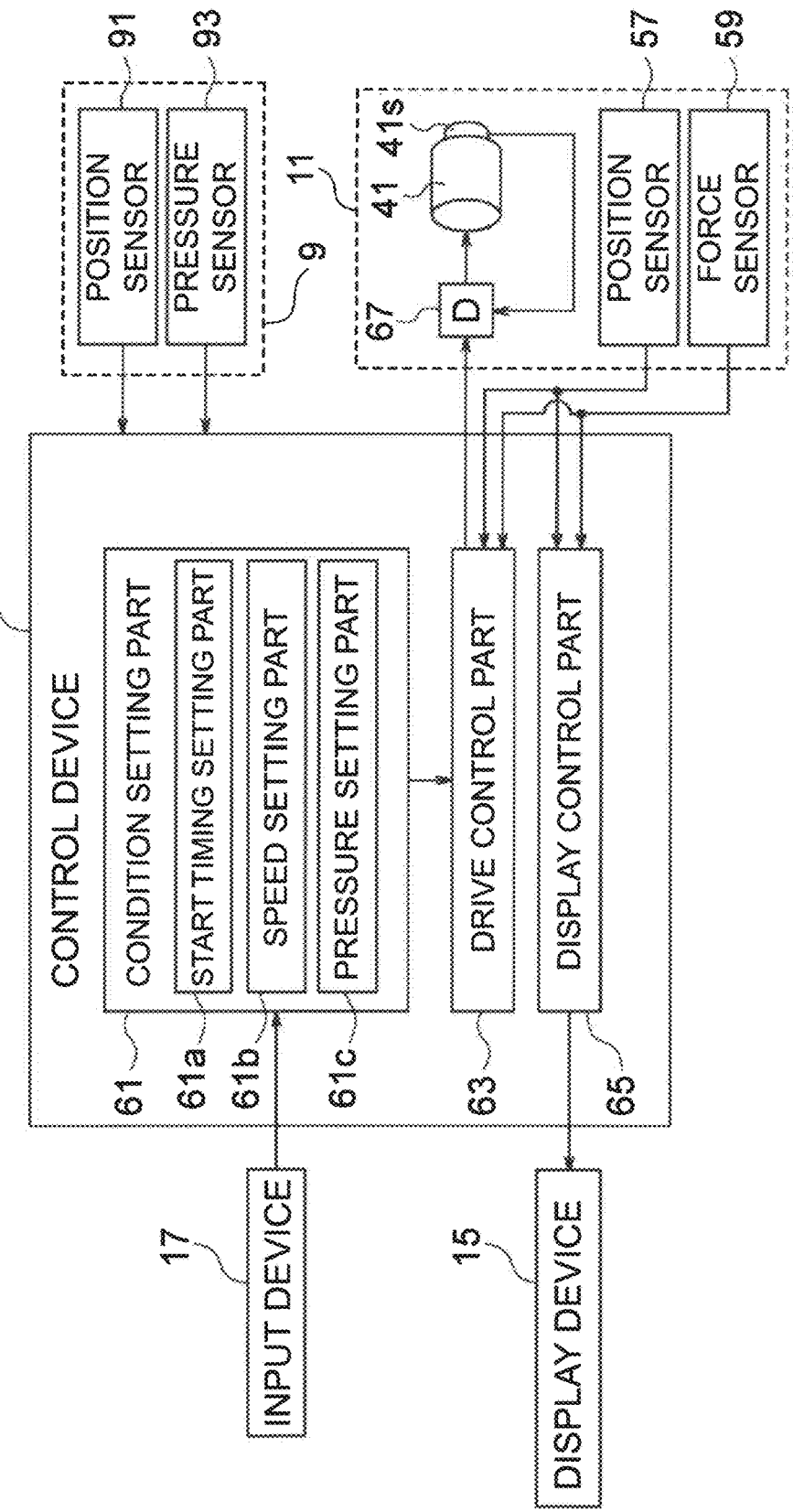
FIG. 4 is a block diagram showing the configuration of a signal processing system of the die casting machine in FIG. 1.

FIG. 4 is a block diagram showing the configuration of a signal processing system of the die casting machine 1. This diagram mainly shows the portion concerning the control of the ejection device 11.

The control device 13 for example comprises a computer including a not shown CPU and memory. Various functional parts for realizing various operations are constructed by the CPU running programs stored in the memory. The various functional parts are for example a condition setting part 61 which sets conditions of the local pushing operation by the ejector pins 31, a drive control part 63 for controlling the electric motor 41, and a display control part 65 which controls the display device 15.

The condition setting portion 61 for example has various setting parts corresponding to the various conditions of the local pushing operation. For example, the condition setting portion 61 has a start timing setting part 61a which sets the start timing of the local pushing operation, a speed setting part 61b which sets the speed of forward movement of the ejector pins 31 in the local pushing operation, and a pressure setting part 61c which sets the pressure given by the ejector pins 31 to the metal material in the local pushing operation. These various types of setting parts for example hold values of various conditions etc. in accordance with the input operation with respect to the input device 17 (strictly speaking, in accordance with the signal which is output from the input device 17 to the control device 13 in response to an input operation with respect to the input device 17).

The start timing of the local pushing operation may be any timing when the ejector pins 31 can push against the metal material before complete solidification. Explaining this in relation with only the operation of the die casting machine 1 excluding individual circumstances such as the temperature at the time of supply of the metal material, the start timing is, to the considerable widest limit, any timing after the start of injection (after the start of forward movement of the plunger 27) up to that before opening of the die. Further, this start timing may be for example a timing at which the plunger 27 reaches a predetermined position or may be a timing at which the speed of the plunger 27 (injection speed) falls to a predetermined speed, may be a timing at which the pressure given to the molding material by the plunger 27 (injection pressure) rises up to a predetermined pressure, or may be a timing at which the predetermined delay time has passed from these various timings or a predetermined operation timing (for example injection start timing).

To the input device 17, for example, values used as the reference of the start timing such as the predetermined position, predetermined speed, or predetermined pressure and/or the value of the predetermined delay time are input. The start timing setting part 61a holds those input values.

The speed of the ejector pins 31 may be controlled so as to become constant, may be controlled to obtain a multistage speed change, or may be controlled so as to follow a suitable speed curve. To the input device 17, for example, that constant value, the multiple speed or a target value of the speed designating the speed curve is input. The speed setting part 61*b* holds those input values.

The pressure given by the ejector pins 31 to the metal material may be for example controlled so as to become the predetermined final pressure or may be controlled so as to follow a predetermined pressure curve. To the input device 17, for example, the above predetermined final pressure or information for identifying the predetermined pressure curve is input. The information for identifying the pressure curve is for example the plurality of points of time after the start timing and the target pressures at those plurality of points of time. The pressure setting part 61*c* holds the value of the final pressure which is input or the values of combination of the plurality of points of time and plurality of target pressures which are input.

Note that, in the local pushing operation, the control of the ejector pins 31 may be either of the position control, speed control, and pressure control and may be a combination of two or more selected from among these controls. Otherwise, these controls may be switched during the local pushing operation as well. Further, for example, the control may be carried out so that the speed and pressure (torque of the electric motor 41) do not exceed the upper limit values while the position control is basically carried out. In this case, for example, the speed setting part 61*b* holds the upper limit value of the speed, while the pressure setting part 61*c* holds the upper limit value of the pressure. Further, for example, speed control may be basically performed while control is performed so that the pressure will not exceed the upper limit value. In this case, for example, the speed setting part 61*b* holds the value of the target speed, while the pressure setting part 61*c* holds the upper limit value of the pressure. Further, for example, pressure control may be basically performed while control is performed so that the speed will not exceed the upper limit value. In this case, for example, the pressure setting part 61*c* holds the final pressure or the values of combination of the points of time and target pressures, while the speed setting part 61*b* holds the upper limit value of the speed.

The drive control part 63 refers to the values which are set and held by the condition setting portion 61, generates a control command based on the values, and outputs the generated control command through the driver 67 to the electric motor 41. That is, the drive control part 63 controls the electric motor 41 so as to realize the conditions (start timing, speed, and/or pressure) designated by an input operation with respect to the input device 17. The control is for example feedback control based on the detection value of the position sensor 57 and/or force sensor 59.

Note that, in the illustrated example, the driver 67 is configured by a servo driver. That is, the driver 67 performs feedback control so that the position and/or speed detected by the rotation detection sensor 41*s* provided on the electric motor 41 follows the control command from the drive control part 63. The rotation detection sensor 41*s* is for example an encoder or resolver.

The display control part 65 for example generates image data showing the positions, speed, pressure, etc. of the ejector pins 31 based on the detection values of the position sensor 57 and force sensor 59 and outputs a video signal to the display device 15 so as to display the image based on that image data in the display device 15. Note that, as understood from the operation which will be explained later, the detection values of the position sensor 57 and force sensor 59 may be input to the condition setting portion 61 in addition to or in place of the display control part 65.

As described above, the start timing of local pushing operation may be determined using the position of the plunger 27, the injection speed or injection pressure as a reference. They may be measured in the same way as various known die casting machines. FIG. 4 illustrates a position sensor 91 which detects the position of the plunger 27 and a pressure sensor 93 which detects the pressure given by the plunger 27 to the metal material.

The position sensor 91 is for example configured by a linear encoder provided in the plunger 27 or injection driving part 29. The position sensor 91 and/or control device 13 can identify the position of the plunger 27 by counting the pulses of the position sensor 91 and can identify the injection speed by counting the pulses per unit time. Note that, in a case where the injection driving part 29 is electric, the rotation detection sensor of the electric motor (for example encoder or resolver) may be used as the position sensor 91 as well.

The pressure sensor 93, for example, in a case where the injection driving part 29 includes an injection cylinder, is a pressure sensor for measuring the oil pressure of the injection cylinder. The control device 13 can identify the injection pressure based on the detection value of the pressure sensor 93 and the area of the front end face of the plunger 27. Note that, the pressure sensor 93 may be one which is provided in the die 101 and directly detects the pressure of the metal material as well. In the case where the injection driving part 29 is electric, a detector for detecting the electric power supplied to the electric motor, and a processing part which calculates the injection pressure from the load calculated from the electric power may be used as the pressure sensor 93 as well. The load cell which is provided at any position in a path from the injection driving part 29 to the plunger 27 and the processing part for calculating the injection pressure from the detection value of the load cell may be used as the pressure sensor 93 as well.

Figure 5:
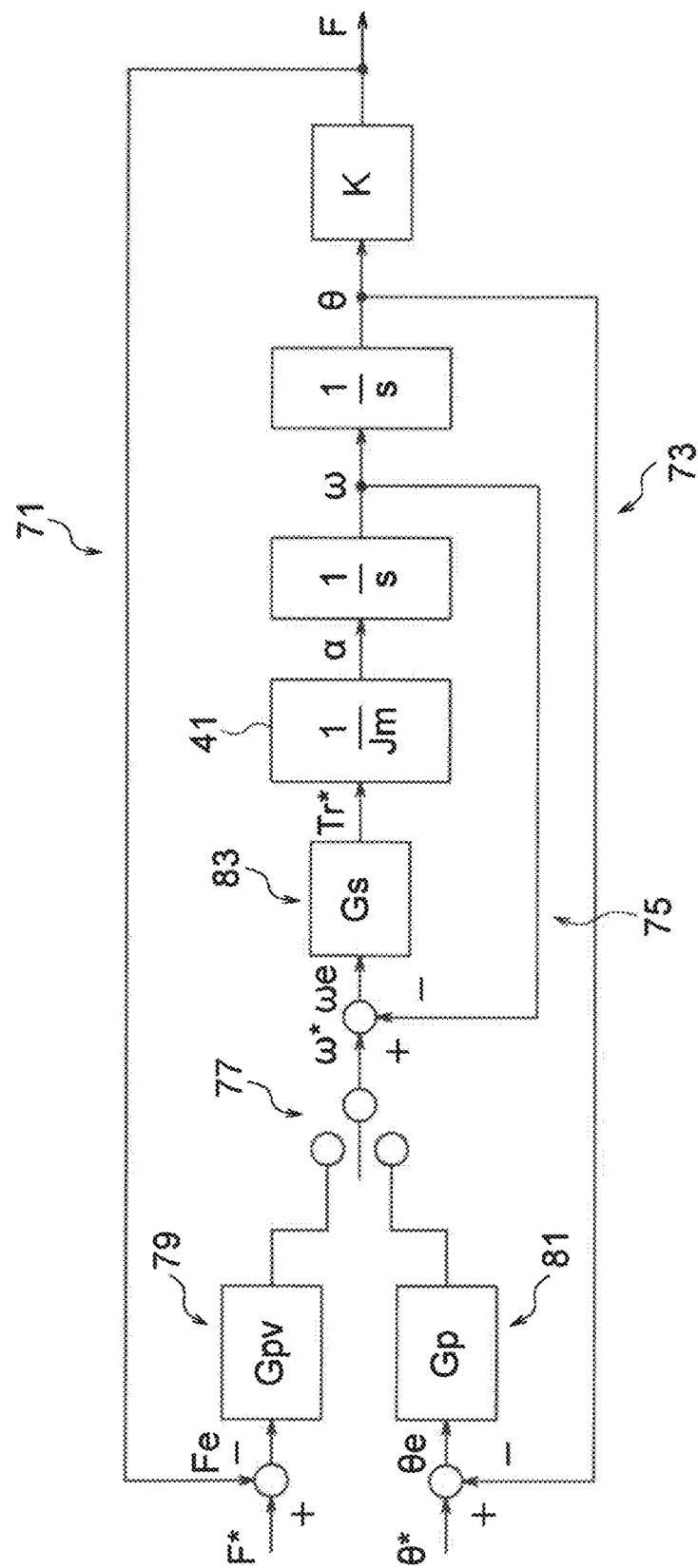
FIG. 5 is a block diagram showing an example of a drive control part in FIG. 4.

FIG. 5 is a diagram showing an example of a block diagram of a control system including the drive control part 63 and electric motor 41.

The shown control system has a force control loop 71 for performing feedback control of the force (pressure) which is given to the metal material by the ejector pins 31 and a position control loop 73 for performing feedback control of the positions of the ejector pins 31. The force control loop 71 and position control loop 73 include a speed control loop 75 as a minor loop and share this. In front of the speed control loop 75, a switch 77 is provided so that the force control and the position control can be switched.

The force control loop 71 has a force control part 79 which multiplies a deviation Fe between a force command F* and the measured force F by a gain Gpv to generate a speed command ω*. The speed command ω* generated by the force control part 79 is input through the switch 77 to the speed control loop 75.

The position control loop 73 has a position control part 81 which multiplies a deviation θe between a position command θ* and the measured position θ by a gain Gp to generate a speed command ω*. The speed command ω* generated by the position control part 81 is input through the switch 77 to the speed control loop 75.

The speed control loop 75 has a speed control part 83 which multiplies a deviation ωe between the speed command ω* and the measured speed ω by a gain Gs to generate a torque command Tr* (current command). The torque command Tr* generated by the speed control part 83 is for example input through a not shown current loop to the electric motor 41.

The electric motor 41 rotates at an acceleration α in accordance with the torque command Tr* and inertia Jm etc. The integrated value of the acceleration α, that is, the speed ω, is fed back to the speed control part 83. Note that, "s" is a Laplace operator. The integrated value of the speed ω, that is, the position θ, is fed back to the position control part 81. The force F which is generated in accordance with the position θ etc. is fed back to the force control part 79. Note that, K is a position/force conversion coefficient.

In this example, for example, the local pushing operation is realized by utilization of the force control loop 71. Further, the operations other than the local pushing operation, for example, retraction of the ejector pins 31, is realized by utilization of the position control loop 73. The forward movement of the ejector pins 31 for taking out the shaped article may be realized by utilization of the force control loop 71 or utilization of the position control loop 73.

FIG. 5 is in the end just an example and may be suitably modified. For example, when performing the local pushing operation by utilizing the force control loop 71, a function of restricting ω* to a predetermined value or less so that the speed ω will not exceed a predetermined speed may be added as well. Further, for example, the local pushing operation may be carried out by utilizing the position control loop 73, and a function of restricting Tr* to a predetermined value or less so that the force F will not exceed a predetermined force in this local pushing operation may be added.

(Example of Displayed Image)

Figure 6:
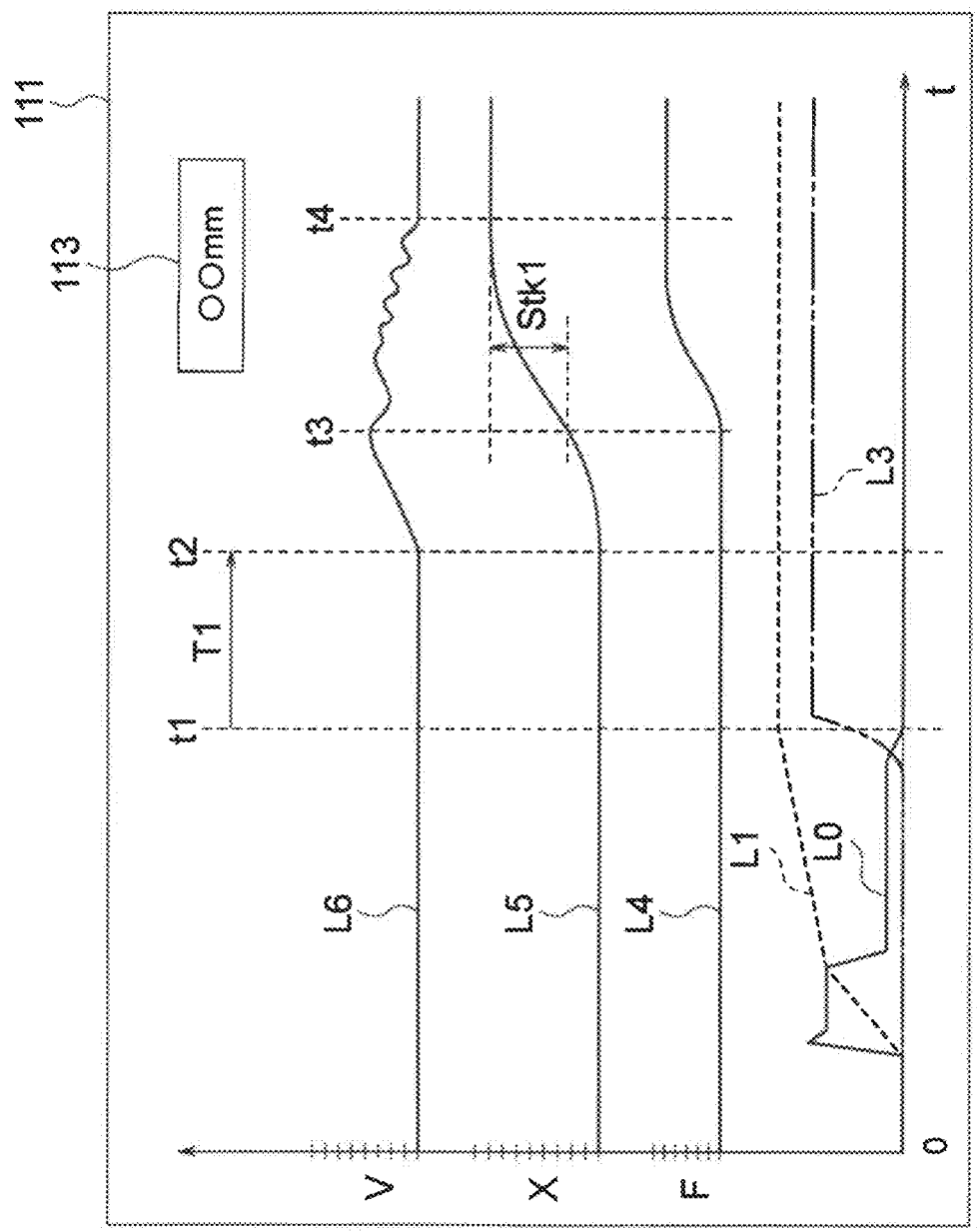
FIG. 6 is a view showing an example of an image displayed on a display device in FIG. 4.

FIG. 6 is a diagram schematically showing an example of an image 111 displayed on a screen of the display device 15.

In the image 111, the abscissa "t" is the time axis. The ordinate shows the magnitudes of various measurement values. Further, the various lines L0, L1 and L3 to L6 show the changes along with time of various measurement values.

Specifically, the line L0 indicates the injection speed based on the detection value of the position sensor 91. The line L1 indicates the position of the plunger (amount of movement) based on the detection value of the position sensor 91. The line L3 indicates the injection pressure based on the detection value of the pressure sensor 93. The line L4 indicates the pushing force of the ejector pins 31 (the pressure given by the ejector pins 31 to the molding material) based on the detection value of the force sensor 59. The line L5 indicates the position (amount of movement) of the ejector pins 31 based on the detection value of the position sensor 57. The line L6 indicates the speed of the ejector pins 31 based on the detection value of the position sensor 57.

In the image 111, although not shown, for example, a plurality of scale marks which extend from the ordinate in a horizontal direction and cross the drawn areas of the lines L0, L1, and L3 to L6 and numerical values which are attached to any or all of these plurality of scale marks are drawn. Therefore, the operator can read the measurement value at any point of time. Further, although not particularly shown, in the image 111, for example, a plurality of scale marks which extend from the abscissa (time axis) in a vertical direction and cross the drawn areas of the lines L0 to L6 are drawn. Therefore, it becomes easy to grasp the correspondence relationships in time among the lines L0, L1, and L3 to L6. Note that, for example, the elapsed time from the predetermined timing is attached to any or all of these plurality of scale marks.

In this diagram, as the injection speed (L0), the speed in the case of injection of the metal material in the semi-solid state is illustrated. Specifically, the injection speed is set to a relatively high speed in a time period during which the metal material in the semi-solid state moves to a certain extent in the sleeve 25 by the plunger 27 and then is set to a low speed. Note that, naturally, in place of such injection, a liquid-state metal material may be injected by low speed injection and high speed injection as well. When filling is completed to a certain extent, the injection speed falls, and the injection pressure (L3) rises. The injection pressure converges to a basically constant value.

In the example in this diagram, the timing of start of the local pushing operation (start of forward movement of the ejector pins 31) is made the time (point of time t2) when the predetermined delay time T1 has elapsed after the plunger 27 stops (point of time t1). The delay time T1 is for example set by operation with respect to the input device 17.

The speed (line L6) of the ejector pins 31 rises from the point of time t2. For example, roughly speaking, the speed of the ejector pins 31 rises with a substantially constant acceleration. After that, this speed may converge to a value held by the speed setting part 61*b*, may converge to a value determined according to the performance and load of the electric motor 41, or may decelerate by the force received from the metal material before such convergence. Finally, the ejector pins 31 decelerate and stop (point of time t4) by the force which is received by the ejector pins 31 from the metal material and/or abutting of the guide pins 35 against the fixed die 103. Part or all of the speed change of the ejector pins 31 may be realized by speed control of the electric motor 41 or may be generated as a result of the position control or pressure control of the electric motor 41.

Further, the amount of movement (line L5) of the ejector pins 31 rises from the point of time t2. That rising curve reflects the speed described above.

The pressure (line L4) of the ejector pins 31, in the illustrated example, does not start rising, or the rate of change of the rise is small, at the point of time t2, while starts rising at the point of time t3 delayed from the point of time t2, or the rate of change of the rise becomes large. Further, the pushing force converges to a constant value. This convergence is for example realized by pressure control making the detection pressure approach the target value held by the pressure setting part 61*c*. Further, for example, this may be realized by trying to make the ejector pins 31 advance beyond the forward limit by the position control of the electric motor 41 and the pushing force reaches the upper limit value of the pushing force held by the pressure setting part 61*c*.

(Effective Stroke)

As described above, the rise of the pushing force (line L4) or an increase of the rate of change of the rise is started (point of time t3) with a time lag from the start (point of time t2) of the forward movement of the ejector pins 31. Further, at the timing before or after that, fluctuation occurs in the speed (line L6) of the ejector pins 31.

Such a phenomenon occurs according to for example the influence of the solidification state of the metal material. Specifically, immediately after the start of forward movement of the ejector pins 31, the solidification of the metal material has not advanced so much, therefore the ejector pins 31 can smoothly move forward without large resistance and consequently will linearly move forward with respect to time. On the other hand, when the solidification of metal material advances, the ejector pins 31 will receive relatively large resistance, therefore will nonlinearly advance with respect to time.

Further, the position sensor 57 for detecting the positions of the ejector pins 31 strictly speaking detects the position of the ejection plate 33. Accordingly, for example, if there is play between the ejector pins 31 and the ejection plate 33 or the ejector pins 31 warp, the timing of receiving the pressure by the ejector pins 31 is delayed with respect to the timing of rise of the position and speed detected by the position sensor 57 by that amount. Further, unlike FIG. 3, for example, if the position sensor 57 is one detecting the positions of the ejection rods 37, the timing of receiving the pressure by the ejector pins 31 is delayed with respect to the timing of rise of the position and speed detected by the position sensor 57 by the amount of the play between the ejection rods 37 and the ejection plate 33. In a case where the position sensor 57 is provided on the further rear side from the ejection rods 37 or the rotation detection sensor 41s of the electric motor 41 is used as the position sensor 57, the play etc. further increase. Also, such a circumstance exerts an influence upon the deviation relative to the point of time t2 and the point of time t3.

Here, the amount of movement from when the forward movement of the ejector pins 31 becomes nonlinear to when the ejector pins 31 have stopped (amount of movement from the point of time t3 to the point of time t4) will be referred to as the "effective stroke Stk1". The effective stroke Stk1 may also be grasped as the amount of movement of the ejector pins 31 after the pushing force of the ejector pins 31 exceeds the predetermined threshold value. In the illustrated example, the predetermined threshold value is set to substantially 0. Note, the predetermined threshold value may be larger than 0 as well.

The image 111 displays the positions, speed, and pushing force of the ejector pins 31 (lines L4 to L6) along the common time axis, therefore the operator can identify the effective stroke Stk1 by viewing the image 111. Note that, the operator can identify the effective stroke Stk1 from only the positions and pushing force of the ejector pins 31 (line L5 and L4) and can identify the effective stroke Stk1 from only the position and speed of the ejector pins 31 (lines L5 and L6).

Further, the control device 13 may identify the effective stroke Stk1 by judging the start position of the effective stroke Stk1 from at least one of the speed and pushing force of the ejector pins 31. Further, the control device 13 may include an image 113 displaying the effective stroke Stk1 by a numerical value in the image 111 as well.

Here, for example, in order to reduce the shrinkage cavity by a local pushing operation, it becomes important that the ejector pins 31 move forward while following the formation of the shrinkage cavity. In a case where this is suitably carried out, the total amount of the shrinkage cavity which is formed (part or all of that finally disappearing) and the volume by which the ejector pins 31 push against the metal material after the start of formation of the shrinkage cavity coincide. The volume by which the ejector pins 31 push against the metal material after the start of formation of the shrinkage cavity has a strong correlation with the amount of movement of the ejector pins 31 (that is, the effective stroke) from the timing at which the metal material is solidified and the forward movement of the ejector pins 31 becomes nonlinear. On the other hand, the amount of the shrinkage cavity can be estimated from the shape of the die.

Accordingly, for example, by estimating the amount of the shrinkage cavity from the shape of the die in advance and identifying the target value of the effective stroke Stk1 corresponding to that amount of shrinkage cavity, the operator or control device 13 compares the measurement value and the target value of the effective stroke Stk1 and can judge the quality of the conditions of the local pushing operation. For example, for the effective stroke Stk1, if the measurement value is smaller than the target value, the probability that the shrinkage cavity will remain is high. Further, if the measurement value is larger than the target value, the probability of occurrence of inconveniences other than the shrinkage cavity due to an excessive local pushing operation is high. Further, the operator or control device 13 can control the local pushing operation to be suitably carried out by changing the conditions of the local pushing operation.

The conditions changed at this time are for example the delay time T1, speed of ejector pins 31 (target value or upper limit value), and/or pushing force (target value or upper limit value). Which condition exerts what influence depends upon the relative relationships of the points of time t2, t3, and t4 (or positions corresponding to them) and factor thereof. Accordingly, the conditions may be suitably changed in accordance with the individual situations.

For example, in the example in FIG. 6, assume that, before the arrival at the forward limit defined by the guide pins 35, the measurement value of the pushing force of the ejector pins 31 reaches the target value or upper limit value and the ejector pins 31 stop at the point of time t4. In this case, for example, when the delay time T1 is made long, the ejector pins 31 start forward movement after the solidification advances more, therefore the probability of decrease of the effective stroke Stk1 is high. Further, for example, if the target value or upper limit value of the pushing force is made large, the probability of increase of the effective stroke Stk1 is high.

Further, for example, assume that the delay from the point of time t2 to the point of time t3 is caused by the delay of solidification of the molten metal, the target value or upper limit value of the pushing force is set sufficiently high, and the ejector pins 31 reach the forward limit defined by the guide pins 35 at the point of time t4. In this case, for example, when the delay time T1 is made long, the amount of movement before the solidification of the molten metal is reduced, and the probability of increase of the effective stroke Stk1 is high. Further, for example, when the speed is raised, the amount of movement before the solidification of molten metal increases, and the probability of decrease of the effective stroke Stk1 is high.

Further, for example, assume that the delay from the point of time t2 to the point of time t3 is caused by the play from the member measured in the position by the position sensor 57 to the ejector pins 31 (force sensor 59 in another viewpoint) and the ejector pins 31 have reached the forward limit defined by the guide pins 35 at the point of time t4. In this case, for example, if the speed is raised, the time until the elimination of the play becomes short, therefore the probability of increase of the effective stroke Stk1 is high.

(Processing Procedure)

FIG. 7 is a flow chart showing an example of the procedure of processing for adjusting the pushing operation executed by the control device 13. Note that, this flow chart may also be grasped as a procedure executed by an operator. This processing is for example executed for each of one or a predetermined number of molding cycles when a molding cycle is repeatedly carried out.

At step S1, the control device 13 identifies the measurement value of the effective stroke Stk1 based on the detection results of the position sensor 57 and force sensor 59.

At step S2, the control device 13 calculates the difference between the target value of the effective stroke Stk1 which is set in advance or calculated by itself from the input die information etc. and the measurement value of the effective stroke Stk1 identified at step S1. Further, the control device 13 judges whether that difference is within a permissible range, proceeds to step S3 when judging that the difference is not within the permissible range, while skips the step S3 when judging that the difference is within the permissible range.

At step S3, the control device 13 changes a condition of the local pushing operation. The condition to be changed is for example at least one of the start timing of the local pushing operation (forward movement start timing of the ejector pins 31), the speed of the ejector pins 31, and the pushing force of the ejector pins.

Note that, as explained above, the conditions of the local pushing operation are suitably changed in accordance with the individual circumstances. When some conditions or controls are limited, the cause and effect between the change of conditions and the results become simple, therefore change of conditions by the control device 13 becomes possible. For example, the target value or upper limit value of the pushing force being set sufficiently large, and the ejector pins 31 reliably reaching the forward limit defined by the guide pins 35 are made preconditions. In this case, for example, when the delay time T1 is made long within a reasonable range, the amount of movement of the ejector pins 31 after the start of solidification becomes long (the amount of movement before the start of solidification is reduced) and consequently the effective stroke Stk1 becomes long.

FIG. 8 is a flow chart showing an example of the procedure of the processing for identifying the effective stroke executed by the control device 13. This processing is for example executed at step S1 in FIG. 7. Note that, in this chart, for convenience, not only the procedure for identifying the effective stroke, but also a portion of the procedure of the local pushing operation are shown.

At step S11, the control device 13 judges whether the pushing start conditions are satisfied, proceeds to step S12 when judging that they are satisfied, while stands by (repeats step S11) when judging that they are not satisfied. The pushing start conditions (pushing start timing) may be suitably set as explained with reference to FIG. 4.

At step S12, the control device 13 starts the drive control of the electric motor 41 so as to move the ejector pins 31 forward.

At step S13, the control device 13 judges whether the pushing force of the ejector pins 31 exceeds a predetermined threshold value based on the detection value of the force sensor 59, proceeds to step S14 when judging that it exceeds it, while stands by (repeats step S13) when judging that it does not exceed it.

At step S14, the control device 13 starts to measure the amount of movement of the ejector pins 31 based on the detection value of the position sensor 57. Specifically, for example, if the position sensor 57 is a linear encoder, it counts the pulses output from the position sensor 57 after a positive judgment at step S13.

At step S15, the control device 13 judges whether the ejector pins 31 have stopped based on the detection value of the position sensor 57. For example, if the position sensor 57 is a linear encoder, the control device 13 judges that the ejector pins 31 have stopped at the time when no pulse is output from the position sensor 57 for a predetermined time. Further, the control device 13 proceeds to step S16 when judging they have stopped, while stands by (repeats step S15) when judging they have not stopped.

At step S16, the control device 13 ends the measurement of the amount of movement of the ejector pins 31. Further, it utilizes the amount of movement of the ejector pins 31 measured from step S14 to S16 as the effective stroke Stk1 for the display of numerical values in the display device 15 or change of step S3.

As described above, the die casting machine 1 in the present embodiment has the plurality of ejector pins 31 capable of advancing and retracting together with respect to the internal portion of the die 101, the electric motor 41 capable of driving the plurality of ejector pins 31, the position sensor 57 capable of detecting the positions of the plurality of ejector pins 31, the force sensor 59 capable of detecting the pressure which is given by the plurality of ejector pins 31 to the molding material inside the die, the display device 15 capable of displaying images, and the control device 13 for controlling the electric motor 41 and display device 15. The control device 13 has the drive control part 63 which controls the electric motor 41 so as to generate the driving force making the plurality of ejector pins 31 advance toward the internal portion of the die 101 after the start of injection and before die opening and the display control part 65 which controls the display device 15 so as to display the position detected by the position sensor 57 and the pressure detected by the force sensor 59 along the common time axis.

Accordingly, as already explained, the operator can identify the effective stroke Stk1 based on the displayed image 111 and judge the quality of conditions of the local pushing operation. As a result, efficient use of the local pushing operation is facilitated. Here, usually the plurality of ejector pins 31 are provided. Accordingly, compared with a case where pushing pins dedicated to the local pushing operation are provided, monitoring of the effective stroke Stk1 becomes particularly important. This is because the error of the volume after the local pushing operation becomes the magnitude obtained by multiplying the error of the effective stroke Stk1 by the number of ejector pins 31. However, the technique of utilizing the effective stroke Stk1 in the present disclosure may be applied to a configuration providing dedicated pushing pins as well.

The art in the present disclosure is not limited to the above embodiments and may be executed in various ways.

The molding machine is not limited to a die casting machine. For example, the molding machine may be another metal molding machine, may be an injection molding machine for molding a resin, or may be a molding machine for molding a material obtained by mixing a thermoplastic resin or the like with saw dust. Further, the molding machine is not limited to horizontal clamping/horizontal injection, and for example may perform vertical clamping/vertical injection, horizontal clamping/vertical injection, or vertical clamping/horizontal injection.

In the above embodiments, as the sensor for detecting the position of the ejector pins 31, a sensor for detecting the position of the ejection plate 33 was provided. Further, it was also stated that the position of another member fixed relative to the ejector pins 31 could be detected in place of the ejector pins 31. However, such a sensor need not be provided: the rotation detection sensor 41s for detecting the rotation of the electric motor 41 may be utilized as the position sensor as well. Further, a sensor for detecting a linear position or rotational position of a suitable member provided in the path from the electric motor 41 to the ejection rod 37 may be used as well.

Further, in the present disclosure, the case of "detection" or "display" of position may include the "detection" or "display" of a physical quantity which has a linear relationship with respect to the position. For example, the positions of ejector pins (amounts of movement) and the volume by which the plurality of ejector pins push against the metal material have linear relationships. Accordingly, for example, display of the positions of the ejector pins along the time axis includes display the volume by which the plurality of ejector pins push against the metal material (the value obtained by multiplying the amount of movement of the ejector pins by the cross-sectional area and number of ejector pins) along the time axis. In the same way, the display of a numerical value of the volume by which the plurality of ejector pins push against the metal material after the pressure becomes the predetermined threshold value or more is included in the display of the numerical value of the amount of movement of the ejector pins (effective stroke) after the pressure becomes the predetermined threshold value or more.

In the embodiments, the force sensor 59 (load cell) for detecting the force received by the ejector pins 31 was provided as the sensor for detecting the force (pressure) given to the molding material by the ejector pins 31. It was also stated that the force which is received by the member fixed relative to the ejector pins 31 (including also the case where there is play) could be detected in place of the ejector pins 31. Note, such a sensor need not necessarily be provided. A detector for detecting electric power supplied to the electric motor 41 and a processing part which calculates the load (torque) from the electric power detected by the detector may be used as the force sensor as well. Use may be also made of a sensor which detects the force or torque received by a suitable member provided in the path from the electric motor 41 up to the ejection rods 37. Pressure sensors detecting the pressure of the metal material may be provided at the tips of the ejector pins 31 as well.

Further, the case of "detection" or "display" of pressure may include the "detection" or "display" of a physical quantity which has a linear relationship with respect to the pressure. For example, although overlapping with the above explanation, the torque of the electric motor, the force obtained by converting the torque to linear motion which is transmitted to each member, and the pressure given to the molding material by the ejector pins have linear relationships. Accordingly, for example, the detection or display of such torque and force are included in the detection or display of the pressure.

The embodiments illustrated the transmission mechanism 43 configured by a pulley belt mechanism and the conversion mechanism 45 configured by a screw mechanism as the mechanism of transmitting the driving force of the rotary electric motor 41 to the ejector pins. However, in place of the pulley belt mechanism, the transmission mechanism may also be configured by a gear mechanism or other mechanism, or the transmission mechanism need not be provided and the rotation of the electric motor 41 may be directly transmitted to the conversion mechanism 45. Further, in place of the screw mechanism, the conversion mechanism may be configured by a link mechanism or rack and pinion mechanism or another mechanism. The roles of the screw and the nut in the screw mechanism (which linearly moves together with the ejector pins) may be reverse to those in the embodiments. Use may be made of a linear motor in place of the rotary electric motor, and the conversion mechanism may be omitted.

Feedback control was performed in the above embodiments, but open control may be performed in part or all as well.

Priority is claimed on Japanese application No. 2016-222061, filed on Nov. 15, 2016, the content of which is incorporated herein by reference.

REFERENCE SIGNS LIST

1 . . . die casting machine (molding machine), 13 . . . control device, 15 . . . display device, 41 . . . electric motor, 57 . . . position sensor, 59 . . . force sensor, 63 . . . drive control part, 65 . . . display control part, and 101 . . . die.

The invention claimed is:
1. A molding machine comprising:
a plurality of ejector pins capable of moving together with respect to a mold,
an electric motor capable of driving the plurality of ejector pins,
a position sensor capable of detecting positions of the plurality of ejector pins,
a pressure sensor capable of detecting a pressure which is given by the plurality of ejector pins to a molding material,
a display device capable of displaying an image, and
a control device controlling the electric motor and the display device, wherein
the control device comprises
a drive control part which controls the electric motor so as to generate a driving force moving the plurality of ejector pins forward to an internal portion side of the mold after start of injection and before die opening and
a display control part which controls the display device so as to display the positions detected by the position sensor and the pressure detected by the pressure sensor along a common time axis.
2. The molding machine according to claim 1, wherein the display control part controls the display device so as to display a speed of the plurality of ejector pins based on a detection value of the position sensor along the time axis.
3. The molding machine according to claim 1, wherein the display control part controls the display device so as to display by a numerical value an amount of movement of the plurality of ejector pins to the internal portion side of the mold based on a detection value of the position sensor, the amount of movement being after the pressure detected by the pressure sensor becomes a predetermined threshold value or more.
4. The molding machine according to claim 1, further comprising an input device on which an input operation is carried out, wherein the drive control part controls the electric motor so as to start a forward movement of the plurality of ejector pins at a timing designated by the input operation.
5. The molding machine according to claim 1, further comprising an input device on which an input operation is carried out, wherein the drive control part controls the electric motor so that the plurality of ejector pins move forward at a speed designated by the input operation.
6. The molding machine according to claim 1, further comprising an input device on which an input operation is carried out, wherein the drive control part controls the electric motor so that the plurality of ejector pins push against the molding material inside the mold by a pressure designated by the input operation.
7. The molding machine according to claim 1, wherein the drive control part changes at least one of a forward movement start timing of the plurality of ejector pins, a speed of the plurality of ejector pins, and a force given by the plurality of ejector pins to the molding material in accordance with an amount of movement of the plurality of ejector pins to an internal portion side of the mold based on a detection value of the position sensor, an amount of movement being after the pressure detected by the pressure sensor becomes a predetermined threshold value or higher.

* * * * *